(12) United States Patent
Marshall et al.

(10) Patent No.: US 12,595,885 B2
(45) Date of Patent: Apr. 7, 2026

(54) NONUNIFORM WALL THICKNESS PROFILE FOR TEARDROP PRESSURE VESSELS

(71) Applicant: Hamilton Sundstrand Corporation, Charlotte, NC (US)

(72) Inventors: Travis Huntington Marshall, West Hartford, CT (US); Evan J. Butcher, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 333 days.

(21) Appl. No.: 18/213,549

(22) Filed: Jun. 23, 2023

(65) Prior Publication Data

US 2024/0426430 A1 Dec. 26, 2024

(51) Int. Cl.
*F17C 13/08* (2006.01)
*B33Y 80/00* (2015.01)
*F17C 13/00* (2006.01)

(52) U.S. Cl.
CPC ............ *F17C 13/002* (2013.01); *B33Y 80/00* (2014.12); *F17C 2201/0147* (2013.01); *F17C 2203/0617* (2013.01)

(58) Field of Classification Search
CPC F17C 13/002; F17C 13/08; F17C 2201/0147; F17C 2203/0617
USPC ........................................................ 220/581
See application file for complete search history.

(56) References Cited

U.S. PATENT DOCUMENTS

| | | | |
|---|---|---|---|
| 10,781,973 B2 | 9/2020 | Bernard et al. | |
| 11,021,963 B2 | 6/2021 | Binek et al. | |
| 11,401,953 B2 | 8/2022 | Crawford et al. | |
| 2020/0347728 A1 | 11/2020 | Binek et al. | |
| 2023/0079398 A1 | 3/2023 | Bucher et al. | |
| 2023/0160501 A1 | 5/2023 | Duri et al. | |

FOREIGN PATENT DOCUMENTS

| | | | | |
|---|---|---|---|---|
| DE | 19745599 | * | 4/1999 | ............... F16L 9/00 |
| DE | 19745599 A1 | | 4/1999 | |
| NL | 1021681 | * | 4/2004 | ............... F16L 9/00 |
| NL | 1021681 C1 | | 4/2004 | |

OTHER PUBLICATIONS

Extended European Search Report for EP Application No. 24182104. 0, dated Oct. 16, 2024, 8 pages.

* cited by examiner

*Primary Examiner* — Don M Anderson
*Assistant Examiner* — Elizabeth J Volz
(74) *Attorney, Agent, or Firm* — Kinney & Lange, P.A.

(57) ABSTRACT

A pressure vessel includes a body defined by a cross-sectional shape along a plane transverse to a centerline. The cross-sectional shape includes an inner surface defining an interior void and a wall extending from the inner surface to an outer surface defining an exterior of the body. The inner surface includes an arcuate region and a gabled region. The gabled region forms a curved interior peak opposite a center of the arcuate region. The arcuate region and the gabled region together define a teardrop shape. The wall includes a curved segment along the arcuate region having a curved segment minimum thickness at a location opposite the interior peak, an apex aligned with the interior peak and having an apex thickness, and thickened regions adjacent intersections between gabled region and the arcuate region and having greater radial thickness than the curved segment minimum thickness.

20 Claims, 3 Drawing Sheets

NONUNIFORM WALL THICKNESS PROFILE FOR TEARDROP PRESSURE VESSELS

BACKGROUND

The present disclosure relates generally to pressure vessels and more particularly to pressure vessels formed by additive manufacturing.

Many applications require the containment and/or transport of fluids under pressure. Applications relevant to the present disclosure include but are not limited to transporting fuel or oil through a pump or control housing and transporting air between systems of a jet engine. Typically, fluid transport is provided with integrally cast or machined passages or passages formed with sheet metal welded or mechanically connected to a component. Additive manufacturing can be used to manufacture components with integral fluid transport passages, however, constraints in the additive manufacturing process can require modifications to a cross-sectional shape of the passages and/or use of support structures. To avoid use of support structures, round passages can be converted to a teardrop profile with similar cross-sectional area. While the teardrop fluid passage profiles are compliant to additive manufacturing constraints, tight radii create stress concentrations with extremely elevated stresses compared to round passages for similar operating pressures. This increases the stress levels of a thin-walled structure significantly. Uniform thickening of walls of the pressure vessel can reduce stress concentrations but often with an undesirable increase in weight of the component.

There is a need for thin-walled pressure vessels that can be formed via additive manufacturing without the need for internal support structures and that do not require significant material addition to meet structural requirements.

SUMMARY

A pressure vessel includes a body defined by a cross-sectional shape along a plane transverse to a centerline. The cross-sectional shape includes an inner surface defining an interior void and a wall extending from the inner surface to an outer surface defining an exterior of the body. The inner surface includes an arcuate region and a gabled region. The gabled region forms a curved interior peak opposite a center of the arcuate region. The arcuate region and the gabled region together define a teardrop shape. The wall includes a curved segment along the arcuate region having a curved segment minimum thickness at a location opposite the interior peak, an apex aligned with the interior peak and having an apex thickness, and thickened regions adjacent intersections between gabled region and the arcuate region and having greater radial thickness than the curved segment minimum thickness.

The present summary is provided only by way of example, and not limitation. Other aspects of the present disclosure will be appreciated in view of the entirety of the present disclosure, including the entire text, claims and accompanying figures.

Figure 1:
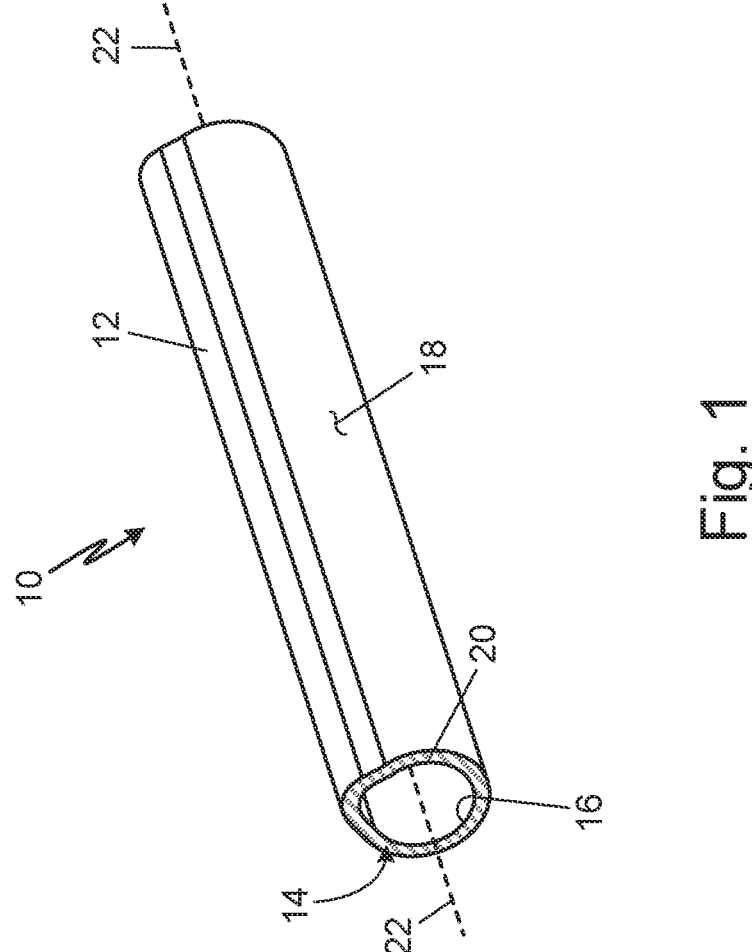
FIG. 1 is a perspective view of a segment of a thin-walled pressure vessel formed via additive manufacturing.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a cross-sectional profile of a thin-walled pressure vessel formed via additive manufacturing. The disclosed cross-sectional profile can provide reductions in stress and weight as compared to pressure vessels with similar passage geometries and uniform wall thickness.

FIG. 1 is an example of a segment of a pressure vessel formed via additive manufacturing. FIG. 1 shows pressure vessel segment 10, body 12, cross-sectional profile 14, inner surface 16, outer surface 18, wall 20, and centerline 22. Pressure vessel segment 10 can be a fluid conduit configured to transport a pressurized fluid or a vessel (e.g., reservoir or tank) configured to contain a pressurized fluid. An end of pressure vessel segment 10 is open to show cross-sectional profile 14. Pressure vessel segment 10 has solid body 12 and an interior void or passage configured to contain and/or transport the pressurized fluid. Inner surface 16 defines the interior void. Wall 20 extends from inner surface 16 to outer surface 18. Outer surface 18 defines an exterior of body 12. Pressure vessel segment 10 extends longitudinally along centerline 22. Centerline 22 can form a tortuous path in some embodiments. Cross-sectional profile 14 is taken along a plane transverse to centerline 22. Inner surface 14 has a teardrop profile, as described further herein, to meet additive manufacturing constraints. Wall 20 has a non-uniform thickness as described further herein to reduce stress concentrations with a limited or minimal amount of material addition.

Body 12 is a monolithic or unitary body formed by a powder bed additive manufacturing process as a single mass of material. Pressure vessel segment 10 can be integrally formed with a component used for storing and/or transporting a pressurized fluid, such as a pump. Pressure vessel segment 10 can be a reservoir or storage tank configured to contain a pressurized fluid or can be a conduit for transporting a pressurized fluid and can be integrally formed with any apparatus or component having such application. Pressure vessel segment 10 can be integrally formed with other pressure vessel segments having the same or different cross-sectional geometry. The cross-sectional geometry can vary as a function of the additive manufacturing build process and trajectory of centerline 22 as described further herein. Pressure vessel segment 10 can be formed from any material suitable for containing a pressurized fluid for a given application. The cross-sectional profile 14 of pressure vessel segment 10 can be varied within the scope of the disclosure to accommodate additive manufacturing material constraints and process constraints as discussed further herein.

Figure 2:
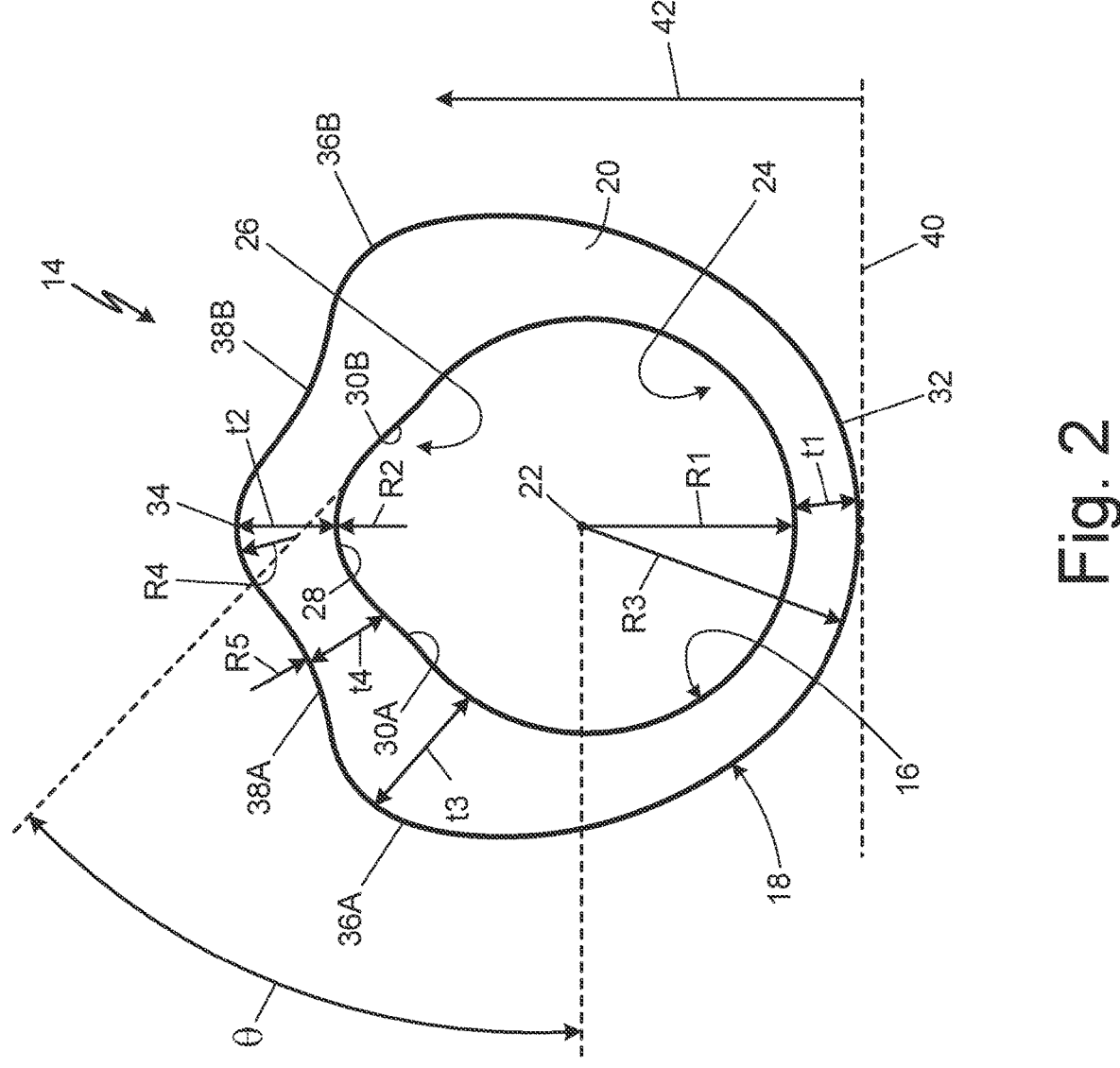
FIG. 2 is a cross-sectional profile of the segment of FIG. 1.

FIG. 2 shows cross-sectional profile 14 of pressure vessel segment 10. Inner surface 16, outer surface 18, wall 20, centerline 22, arcuate region 24, gabled region 26, interior peak 28, straight sections 30A, 30B, curved segment 32, apex 34, thickened regions 36A, 36B, transition regions 38A, 38B, radii of curvature R1, R2, R3, R4, R5, thicknesses t1, t2, t3, t4, build plane 40, build direction 42, and build angle θ are shown. Inner surface 16 defines the interior void of pressure vessel segment 10. Inner surface 16 has arcuate region 24 and gabled region 26. Gabled region 26 includes interior peak 28 and straight sections 30A, 30B. Arcuate region 24 and gabled region 26 together define a teardrop shape, which is symmetric about a centerline extending from arcuate region 24 to interior peak 28 and through centerline 22. Wall 20 extends from inner surface 16 to outer surface 18 defining an exterior of body 12. Wall 20 includes curved segment 32, apex 34, thickened regions 36A, 36B, and transition regions 38A, 38B. Cross-sectional profile 14 of wall 20 is symmetric about a centerline extending from outer surface 18 of curved segment 32 to outer surface 18 of apex 34 and through centerline 22.

Body 12 is built using an additive manufacturing process in the build direction 42. While circular cross-sectional geometries are generally preferred, additive manufacturing process constraints limit the ability to build bodies having circular internal passages extending parallel to build plane 40 without the use of internal temporary support structures. Typically, passages having a diameter greater than 0.5 inches (1.27 cm) require internal support structures when formed in the build direction 42 with centerline 22 extending parallel to build plane 40. Teardrop shaped passages can be formed in the build direction 42 by additive manufacturing processes without the need for internal support structures and, therefore, are a preferred geometry for passages having a centerline 22 extending parallel to build plane 40.

Arcuate region 24 forms a base of the teardrop shape, extending circumferentially around a portion of the internal passage. Arcuate region 24 can be characterized by a substantially constant radius of curvature R1 with respect to centerline 22 through an arcuate region angular extent. Gabled region 26 forms curved interior peak 28 disposed opposite a center of arcuate region 24. Interior peak 28 is a radiused corner having radius of curvature R2, which is smaller than radius of curvature R1. Straight sections 30A, 30B, disposed on opposite sides of inner surface 16, extend from arcuate region 24 to interior peak 28. Straight sections 30A, 30B can be tangent to arcuate region 24 and interior peak 28. Straight sections 30A, 30B can extend at angle θ relative to build plane 40 (shown in FIGS. 2 and 3). Angle θ can be a minimum build angle allowed by an additive manufacturing apparatus without the requirement of internal support structures. In some embodiments, build angle θ can be approximately 45 degrees such that straight section 30A is oriented perpendicular to straight section 30B. In other embodiments, the additive manufacturing process may allow for build angles θ of less than 45 degrees, such that straight section 30A is angularly offset from straight section 30B by an obtuse angle. In yet, other embodiments, build angle θ can be greater than 45 degrees, such that straight section 30A is angularly offset from straight section 30B by an acute angle. Build angle θ and radius of curvature R2 can be selected to reduce a stress concentration at interior peak 28. Preferably, build angle θ can be a minimum build angle θ supported by the additive manufacturing apparatus and material. Preferably, radius of curvature R2 can be a maximum build radius supported by the additive manufacturing apparatus and material. The dimensions of inner surface 16, including radii of curvature R1 and R2 and build angle θ can be modified based on a desired cross-sectional area, fluid flow, and internal pressure, additive manufacturing apparatus constraints, and material constraints.

Regardless of the size of radii of curvature R1 and R2, a stress concentration occurs in gabled region 26 and at interior peak 28 of the teardrop profile. Stresses throughout arcuate region 24 are also increased as compared to a circular profile. Stresses include hoop stress around a perimeter of arcuate region 24 and a radial lever type stress that occurs in gabled region 26 at interior peak 28. Stresses can be highest at interior peak 28 and at intersections of straight sections 30A, 30B and arcuate region 24. Increasing wall thickness can accommodate stresses. As described further herein, a non-uniform distribution of material thickness in wall 20 is provided to reduce stress while limiting or minimizing an amount of weight added to the structure.

Wall 20 includes curved segment 32, apex 34, thickened regions 36A, 36B, and transition regions 38A, 38B. Curved segment 32 of wall 20 is disposed along arcuate region 24. Curved segment 32 extends from thickened region 36A to thickened region 36B. Curved segment 34 can have a substantially constant radius of curvature R3 that is greater than radius of curvature R1 of arcuate region 24. Curved segment 32 has a thickness t1 at a center of curved segment 32 disposed opposite interior peak 28. Thickness t1 is a radial thickness measured between inner surface 16 to outer surface 18 in a radial direction from centerline 22. Thickness t1 is a minimum thickness of wall 20. Wall thickness in curved segment 32 can be less than other segments of wall 20 because the wall thickness in curved segment 32 is primarily reacting to hoop stress. Wall thickness t1 can be selected to meet hoop stress requirements of the application. Wall thickness t1, for example, can be approximately equal to a wall thickness of a cylindrical pressure vessel having equal cross-sectional passage area and internal pressure.

Apex 34 of wall 20 is aligned with interior peak 28. Outer surface 18 in the region spanning apex 34 can be characterized by a convex curve having a radius of curvature R4. Radius of curvature R4 can be greater than, equal to, or less than radius of curvature R1. In some embodiments, apex 34 can be a sharp corner. Apex 34 has a radial thickness t2. Thickness t2 of apex 34 can be equal to or greater than thickness t1 of curved segment 32. An increased thickness t2 at apex 34 can provide stiffness and allow stresses to linearize through the material. Increased stiffness is provided to resist bending at internal peak 28. Thickness t2 can vary depending on a size of radius of curvature R2 and build angle θ. Generally, thickness t2 (as well as thicknesses t1, t3, and t4) is increased as radius of curvature R2 is reduced to accommodate a higher stress concentration at interior peak 28. Apex 34 can appear as a longitudinally extending rib on the exterior of body 12, as shown in FIG. 1.

Thickened regions 36A, 36B are disposed adjacent to intersections of arcuate region 24 and gabled region 26 and adjacent to straight sections 30A, 30B. Outer surface 18 at thickened regions 36A, 36B is characterized by a convexly curved shape or lobe having a variable radius. Maximum radial wall thickness t3 in thickened regions 36A, 36B is greater than thickness t1 in curved segment 32 and thickness t2 at apex 34. The maximum radial wall thickness t3 is less than radius of curvature R1 of arcuate region 24. The maximum radial wall thickness t3 can be located at the intersections of arcuate region 24 and gabled region 26. Specifically, the maximum radial wall thickness t3 can be located at the intersections of arcuate region 24 and straight sections 30A, 30B. Material addition in thickened regions 36A, 36B is provided to resist a stretching effect of hoop stress at the intersections of arcuate region 24 and straight sections 30A, 30B and to react to bending stresses resultant of interior peak 28. Thickened regions 36A, 36B can appear as lobes or ribs extending longitudinally on the exterior of body 12, as shown in FIG. 1.

Outer surface 18 extending between locations of maximum radial thickness t3 in thickened regions 36A, 36B along curved segment 32 is characterized by a convexly curved shape. As shown in FIG. 2, wall 20 smoothly tapers in thickness from locations of maximum radial thickness t3 in thickened regions 36A, 36B to the minimum radial thickness t1 of curved segment 32.

Transition regions 38A, 38B are disposed between thickened regions 36A, 36B and apex 34. Wall thickness decreases from maximum thickness t3 toward apex 34 in transition regions 38A, 38B and decreases from apex thickness t2 toward thickened regions 36A, 36B in transition regions 38A, 38B. Outer surface 18 in transition regions 38A, 38B is characterized by a concave curve, which can be defined by radius of curvature R5. Minimum radial thickness t4 in transition regions 38A, 38B can be less than apex thickness t2 and greater than minimum thickness t1 in curved segment 32. Wall thickness in transition regions 38A, 38B is selected to resist hoop stresses of the teardrop shape while increased stiffness is provided at apex 34 and thickened regions 36A, 36B.

Cross-sectional profile 14 can be symmetric about a centerline (centerline 48 shown in FIG. 3) extending through centerline 22 from outer surface 18 at a center location of curved segment 32 to outer surface 18 at apex 34. Wall thickness can vary depending on pressure, material type, and the specific geometry of the teardrop shape of inner surface 16, while the cross-sectional profile or shape of outer surface 18, including curved segment 32, thickened regions 36A, 36B, transition regions 38A, 38B, and apex 34, remains substantially similar. The relative proportions of curved segment 32, thickened regions 36A, 36B, transition regions 38A, 38B, and apex 34 can remain substantially the same with proportional increase and decreases of the cross-sectional area of the teardrop shape. Pressure vessel segment 10 is an example of a straight tube. In some embodiments, pressure vessel segment 10 can curve in (e.g., in an XY plane) or can be embedded in solid material on one side or along portions of one or more sides due to external additive manufacturing supports or ease of manufacture. In such embodiments, it may be beneficial to have wall thickness differ about centerline 48.

Example

A pressure vessel having a cross-sectional profile 14 is shown to provide a 50% stress reduction at interior peak 28, a 17% stress reduction in arcuate region 24, and a 50% stress reduction in straight sections 30A, 30B as compared to a pressure vessel having the same inner surface cross-sectional profile and a wall of uniform (0.1 inch) thickness. Uniformly increasing wall thickness to 0.175 inches met stress requirements, however, not without significantly increasing the weight of the component. The non-uniform distribution of material as provided in cross-sectional profile 14 resulted in a volume and weight savings of approximately 24% for similar performance.

Figure 3:
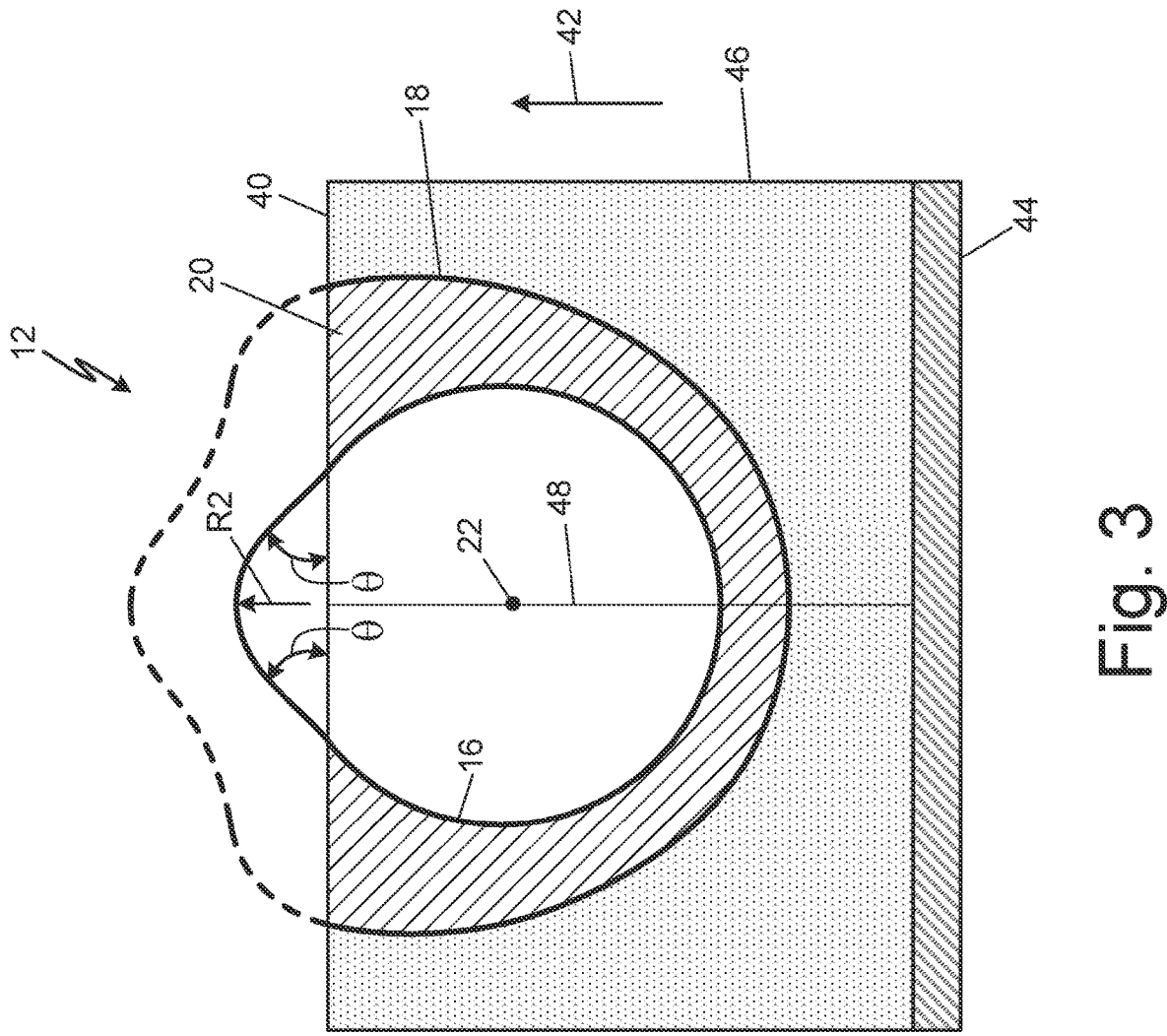
FIG. 3 is a schematic cross-sectional illustration of the thin-walled pressure vessel of FIG. 1 during an additive manufacturing process.

FIG. 3 is a schematic cross-sectional illustration of pressure vessel segment 10 during an additive manufacturing process. Additive manufacturing processes include the ability to produce highly complex parts quickly and efficiently, and to modify design specifications of the desired part, for example by modifying CAD specifications, without retooling casting or machining equipment used for traditional, subtractive manufacturing processes. Additive manufacturing allows complex design features to be incorporated into parts where those complex design features had proved infeasible using previous manufacturing techniques.

FIG. 3 illustrates a powder bed additive manufacturing process. Monolithic body 12 of pressure vessel segment 10, wall 20 extending between inner surface 16 and outer surface 18, centerline 22, build plane 40, build direction 42, build plate 44, powder bed 46, centerline 48, radius of curvature R2, and build angle θ are shown. Body 12 is formed in a layer-by-layer manner in build direction 42. For example, layers of powder are successively deposited on build plate 44 and powder is selectively fused together via sintering and/or melting to form wall 20. Build plate 44 is lowered with each additional powder layer. Pressure vessel segment 10 can be formed using an additive manufacturing system including but not limited to a powder bed fusion additive manufacturing system using laser or electron beam power sources, or various directed energy deposition systems.

During the additive manufacturing process, wall 20 is built in the build direction 42 in a layer-by-layer manner as build plate 44 is lowered and layers of powder are added to build plane 40. Radius of curvature R2 and build angle θ are selected to allow the internal passage defined by inner surface 16 to be formed without the addition of support structures. The teardrop profile of inner surface 16 is oriented with internal peak 28 pointing up relative to build plate 44 and with centerline 48, extending perpendicular to build plate 44, running through centerline 22 and the center of internal peak 28. The orientation of the teardrop shape remains constant throughout the build process. The shape of inner surface 16 can change depending on the orientation of body 12. For example, the shape of inner surface 16 can change from the disclosed teardrop shape to a preferred circular shape for a conduit that turns 90 degrees relative to build plate 44. Cylindrical hollow bodies with passages extending perpendicular to build plate 44 can be formed without the same manufacturing constraints as material layers are built directly on top of and aligned with underlying material layers. Cross-sectional profile 14 is not required for bodies having cylindrical passages as wall thickness is reactive only to hoop stress and/or axial stress. Therefore, wall thickness can become uniform as the orientation of the internal passage changes with respect to the build plane.

As previously described, build angle θ is the angle of straight sections 30A, 30B relative to build plane 40. Build angle θ can be a minimum build angle allowed by the additive manufacturing apparatus without the use of internal structural supports. Radius of curvature R2 can range from a minimum radius of curvature allowed for a given material to a maximus radius curvature allowed by the additive manufacturing apparatus without the use of support structures. Preferably, radius of curvature R2 can be maximized and build angle θ is minimized to limit the stress concentration in internal peak 28.

Body 12 can be formed from metals including but not limited to aluminum, copper, titanium, nickel, vanadium, chromium, iron, and/or alloys of one or more metals. In other embodiments, body 12 can be formed from other materials, including but not limited to, ceramics and polymers.

Although not illustrated in FIG. 3, body 12 can be monolithically formed with other components or structures.

For example, in some embodiments, outer surface 18 can be monolithically formed with and connected to other structures.

The disclosed cross-sectional profile can provide reductions in stress and weight for thin-walled pressure vessels as compared to pressure vessels with similar passage geometries and uniform wall thickness or walls having outer surfaces defined by a convex curve (e.g., bodies having a circular or oval exterior). The disclosed cross-sectional profile is configured to react to the hoop stress and bending stresses associated with teardrop shaped passages to meet performance requirements while limiting or minimizing volume and weight additions.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, variations in additive manufacturing process parameters, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A pressure vessel includes a body defined by a cross-sectional shape along a plane transverse to a centerline. The cross-sectional shape includes an inner surface defining an interior void and a wall extending from the inner surface to an outer surface defining an exterior of the body. The inner surface includes an arcuate region and a gabled region. The gabled region forms a curved interior peak opposite a center of the arcuate region. The arcuate region and the gabled region together define a teardrop shape. The wall includes a curved segment along the arcuate region having a curved segment minimum thickness at a location opposite the interior peak, an apex aligned with the interior peak and having an apex thickness, and thickened regions adjacent intersections between gabled region and the arcuate region and having greater radial thickness than the curved segment minimum thickness.

The pressure vessel of the preceding paragraph can optionally include, additionally and/or alternatively, any one or more of the following features, configurations and/or additional components:

In an embodiment of the pressure vessel of the preceding paragraph, the arcuate region can be characterized by a substantially constant radius with respect to the centerline through an arcuate region angular extent.

In an embodiment of the pressure vessel of any of the preceding paragraphs, a maximum radial thickness of the wall can be less than the radius of the arcuate region.

In an embodiment of the pressure vessel of any of the preceding paragraphs, the gabled portion can include straight sections extending from the arcuate region to the curved interior peak.

In an embodiment of the pressure vessel of any of the preceding paragraphs, the wall can have a maximum radial thickness at the intersections of the gabled region and the arcuate region.

In an embodiment of the pressure vessel of any of the preceding paragraphs, the apex thickness can be greater than or equal to the curved segment minimum thickness.

In an embodiment of the pressure vessel of any of the preceding paragraphs, the thickened regions can have a greater radial thickness than the apex thickness.

In an embodiment of the pressure vessel of any of the preceding paragraphs, the outer surface in the thickened regions can be characterized by a convexly curved shape defined by a variable radius.

In an embodiment of the pressure vessel of any of the preceding paragraphs, the outer surface in a region spanning the apex can be characterized by convex curve.

In an embodiment of the pressure vessel of any of the preceding paragraphs, the wall can further include transition regions between the thickened regions and the apex and the outer surface in transition regions can be characterized by a concave curve.

In an embodiment of the pressure vessel of any of the preceding paragraphs, the outer surface extending between locations of maximum radial thickness in the thickened regions along the curved segment can be characterized by a convexly curved shape.

In an embodiment of the pressure vessel of any of the preceding paragraphs, the wall can taper in thickness from locations of maximum radial thickness in the thickened regions to the minimum thickness of the curved segment.

In an embodiment of the pressure vessel of any of the preceding paragraphs, the pressure vessel can be formed by a powder bed additive manufacturing process and wherein the apex forms an outermost portion of the body along a build direction.

In an embodiment of the pressure vessel of any of the preceding paragraphs, the gabled portion can include straight sections extending from the arcuate region to the curved interior peak and the straight section can be oriented at an angle of 45 degrees or less relative to a build plane.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure vessel extending along a centerline and configured to contain a pressurized fluid, the pressure vessel comprising a body defined by a cross-sectional shape along a plane transverse to the centerline, the cross-sectional shape comprising:

an inner surface defining an interior void, the inner surface comprising:

an arcuate region; and a gabled region, the gabled region forming a curved interior peak opposite a center of the arcuate region, wherein the arcuate region and the gabled region together define a teardrop shape; and a wall extending from the inner surface to an outer surface defining an exterior of the body, the wall comprising:

a curved segment along the arcuate region, the curved segment having a curved segment minimum thickness at a location opposite the interior peak;

an apex portion having an apex defined on the outer surface aligned with the interior peak, the apex having an apex thickness; and thickened regions adjacent intersections between gabled region and the arcuate region, the thickened regions having greater radial thickness than the curved segment minimum thickness.

2. The pressure vessel of claim 1, wherein the arcuate region is characterized by a substantially constant radius with respect to the centerline through an arcuate region angular extent.

3. The pressure vessel of claim 2, wherein a maximum radial thickness of the wall is less than the radius of the arcuate region.

4. The pressure vessel of claim 1, wherein the gabled portion includes straight sections extending from the arcuate region to the curved interior peak.

5. The pressure vessel of claim 1, wherein the wall has a maximum radial thickness at the intersections of the gabled region and the arcuate region.

6. The pressure vessel of claim 1, wherein the apex thickness is greater than or equal to the curved segment minimum thickness.

7. The pressure vessel of claim 6, wherein the thickened regions have a greater radial thickness than the apex thickness.

8. The pressure vessel of claim 7, wherein the outer surface in the thickened regions is characterized by a convexly curved shape defined by a variable radius.

9. The pressure vessel of claim 8, wherein the outer surface in a region spanning the apex portion is characterized by convex curve.

10. The pressure vessel of claim 9, wherein the wall further comprises transition regions between the thickened regions and the apex portion, and wherein the outer surface in transition regions is characterized by a concave curve.

11. The pressure vessel of claim 10, wherein the outer surface extending between locations of maximum radial thickness in the thickened regions along the curved segment is characterized by a convexly curved shape.

12. The pressure vessel of claim 8, wherein the wall tapers in thickness from locations of maximum radial thickness in the thickened regions to the minimum thickness of the curved segment.

13. The pressure vessel of claim 1, wherein the pressure vessel is formed by a powder bed additive manufacturing process and wherein the apex forms an outermost portion of the body along a build direction.

14. The pressure vessel of claim 13, wherein the gabled portion includes straight sections extending from the arcuate region to the curved interior peak and wherein the straight sections are oriented at an angle of 45 degrees or less relative to a build plane.

15. A pressure vessel extending along a centerline and configured to contain a pressurized fluid, the pressure vessel comprising:

a wall of varying thickness, the wall defining:

an inner surface defining an interior void, the inner surface comprising:

an arcuate region; and a gabled region, the gabled region forming a curved interior peak opposite a center of the arcuate region, wherein the arcuate region and the gabled region together define a teardrop shape; and an outer surface defining an exterior of the body, the outer surface comprising:

a curved segment along the arcuate region, wherein the wall has a minimum thickness at a location of the curved segment opposite the interior peak;

an apex aligned with the interior peak and defining a rib on the outer surface;

a first concave region disposed on a first side of the apex; and a second concave region disposed on a second side of the apex.

16. The pressure vessel of claim 15, wherein the wall has a maximum thickness at intersections between gabled region and the arcuate region.

17. The pressure vessel of claim 15, wherein the wall tapers in thickness from locations of maximum thickness to the minimum thickness of the curved segment.

18. The pressure vessel of claim 15, wherein a thickness of the wall at the apex is greater than or equal to the minimum thickness.

19. The pressure vessel of claim 18, wherein the arcuate region is characterized by a substantially constant radius with respect to the centerline through an arcuate region angular extent.

20. The pressure vessel of claim 19, wherein a maximum radial thickness of the wall is less than the radius of the arcuate region.

* * * * *